(12) United States Patent
Lee et al.

(10) Patent No.: US 11,535,294 B2
(45) Date of Patent: Dec. 27, 2022

(54) CARBON STEEL FOR A RACK BAR AND A METHOD FOR MANUFACTURING THE SAME

(71) Applicants: HYUNDAI MOTOR COMPANY, Seoul (KR); KIA MOTORS CORPORATION, Seoul (KR); HYUNDAI STEEL COMPANY, Incheon (KR)

(72) Inventors: Hyung Gook Lee, Hwaseong-si (KR); Jae Han Lim, Asan-si (KR)

(73) Assignees: HYUNDAI MOTOR COMPANY, Seoul (KR); KIA MOTORS CORPORATION, Seoul (KR); HYUNDAI STEEL COMPANY, Incheon (KR)

( * ) Notice: Subject to any disclaimer, the term of this patent is extended or adjusted under 35 U.S.C. 154(b) by 57 days.

(21) Appl. No.: 17/184,267

(22) Filed: Feb. 24, 2021

(65) Prior Publication Data

US 2022/0161843 A1 May 26, 2022

(30) Foreign Application Priority Data

Nov. 26, 2020 (KR) ........................ 10-2020-0160742

(51) Int. Cl.
| | |
|---|---|
| *B62D 3/12* | (2006.01) |
| *C21D 8/06* | (2006.01) |
| *C22C 38/00* | (2006.01) |
| *C22C 38/02* | (2006.01) |
| *C22C 38/04* | (2006.01) |
| *C22C 38/06* | (2006.01) |
| *C21D 9/52* | (2006.01) |
| *C22C 38/54* | (2006.01) |
| *C22C 38/42* | (2006.01) |
| *C22C 38/44* | (2006.01) |

(52) U.S. Cl.
CPC ............. *B62D 3/126* (2013.01); *C21D 8/065* (2013.01); *C21D 9/525* (2013.01); *C22C 38/002* (2013.01); *C22C 38/02* (2013.01); *C22C 38/04* (2013.01); *C22C 38/06* (2013.01); *C22C 38/42* (2013.01); *C22C 38/44* (2013.01); *C22C 38/54* (2013.01)

(58) Field of Classification Search
CPC ........ B62D 3/126; C21D 8/065; C21D 9/525; C22C 38/002; C22C 38/02; C22C 38/04; C22C 38/06; C22C 38/42; C22C 38/44; C22C 38/54

See application file for complete search history.

(56) References Cited

U.S. PATENT DOCUMENTS 9,976,206 B2 * 5/2018 Egashira ................... B21B 3/02

FOREIGN PATENT DOCUMENTS

| KR | 20120081388 A | 7/2012 |
| KR | 101215240 B1 | 12/2012 |

* cited by examiner

*Primary Examiner* — Anthony M Liang
*Assistant Examiner* — Danny N Kang
(74) *Attorney, Agent, or Firm* — Lempia Summerfield Katz LLC

(57) ABSTRACT

Carbon steel for a rack bar contains 0.50 to 0.55% by weight of carbon (C), 0.15 to 0.35% by weight of silicon (Si), 0.75 to 0.95% by weight of manganese (Mn), 0.025% by weight or less of phosphorus (P), 0.025% by weight or less of sulfur (S), 0.65 to 0.85% by weight of chrome (Cr), 0.20% by weight or less of molybdenum (Mo), 0.001 to 0.02% by weight of aluminum (Al), 5 to 50 ppm of boron (B), and iron (Fe) as a remainder and unavoidable impurities. A method for manufacturing the rack bar includes quenching, tempering, and drawing the carbon steel and warm forging the drawn carbon steel.

11 Claims, No Drawings

CARBON STEEL FOR A RACK BAR AND A METHOD FOR MANUFACTURING THE SAME

CROSS-REFERENCE TO RELATED APPLICATION

This application claims the benefit of priority to Korean Patent Application No. 10-2020-0160742, filed in the Korean Intellectual Property Office on Nov. 26, 2020, the entire contents of which are incorporated herein by reference.

TECHNICAL FIELD

The present disclosure relates to carbon steel for a rack bar having excellent mechanical properties such as strength and toughness and a method for manufacturing the same.

BACKGROUND

In recent years, environmental problems are emerging worldwide. As a countermeasure for such environmental problems, a method for reducing use of fossil fuels in an entire industry is being considered. To reduce the fossil fuels, a method for improving an efficiency of a vehicle engine and a method for reducing a weight of the vehicle have been proposed in an automobile field. In this connection, the weight reduction of the vehicle is able to increase a fuel economy of the vehicle to reduce the use of the fossil fuels, but is not able to satisfy mechanical properties such as strength, durability, and the like required by the vehicle. Therefore, solving this has become the biggest goal in the automobile field.

On the other hand, a steering system of the vehicle rotates a steering wheel in a steering direction desired by a driver. The rotation of the steering wheel is transmitted to a gearbox through a column, and finally transmitted to a tire. In this process, a rotational force in the column is transmitted to a rack bar of the gearbox. Because the rack bar is operated by meshing with a pinion shaft of the column, the rack bar is subjected to bending stress and the like, so that strength securing is useful for the rack bar. Further, in an event of a vehicle collision, even when being deformed by an impact load, steering components such as the rack bar should not be damaged to prevent a secondary accident by maintaining a travel direction of the vehicle even after the collision.

For example, in Korean Patent Application Publication No. 2012-0081388 (Patent Document 1) discloses a method for manufacturing a rack bar having a variable gear ratio including: (a) heating a circular material at a predetermined temperature for a predetermined time; (b) performing plastic working on the heat-treated circular material using an upper mold and a lower mold for warm forging; (c) performing trimming of removing flash from a gear portion; and (d) sizing teeth of the gear portion by plastic working using an upper mold and a lower mold for sizing. However, in the manufacturing method of Patent Document 1, a shape of the rack bar of a variable gear may be implemented, but it may be difficult to secure physical properties of the rack bar. In a case of forged components, when quenching and tempering heat-treatment is performed after the shape is made, a shape of the gear portion is deformed because of residual stress during forging of the gear portion, and straightness of the rack bar is changed. The gear portion meshes with the pinion gear and rotates, which requires a very high level of shape precision. When the shape precision of the gear portion is low, noise is generated because of an operating clearance during steering and wear between components is excessively generated, which may lead to safety problems during driving resulted from deterioration of a steering function, so that the precision of the gear is very important.

Therefore, it is useful to research and develop carbon steel for a rack bar that secures excellent mechanical properties such as yield strength, tensile strength, toughness, and the like of a material while implementing the shape of the rack bar gear with excellent precision, thereby having excellent durability even in a high load environment and capable of reducing the vehicle weight, and a method for manufacturing the same.

SUMMARY

The present disclosure has been made to solve the above-mentioned problems occurring in the prior art while advantages achieved by the prior art are maintained intact.

An aspect of the present disclosure provides a rack bar that has excellent mechanical properties such as yield strength, tensile strength, toughness, and the like, thereby having excellent durability even in a high load environment and capable of reducing a vehicle weight, and a method for manufacturing the same.

The technical problems to be solved by the present inventive concept are not limited to the aforementioned problems, and any other technical problems not mentioned herein should be clearly understood from the following description by those having ordinary skill in the art to which the present disclosure pertains.

According to an aspect of the present disclosure, carbon steel for a rack bar contains 0.50 to 0.55% by weight of carbon (C), 0.15 to 0.35% by weight of silicon (Si), 0.75 to 0.95% by weight of manganese (Mn), 0.025% by weight or less of phosphorus (P), 0.025% by weight or less of sulfur (S), 0.65 to 0.85% by weight of chrome (Cr), 0.20% by weight or less of molybdenum (Mo), 0.001 to 0.02% by weight of aluminum (Al), 5 to 50 ppm of boron (B), and iron (Fe) as a remainder and unavoidable impurities.

According to another aspect of the present disclosure, a rack bar for a vehicle contains the carbon steel.

According to another aspect of the present disclosure, a vehicle includes the rack bar for the vehicle.

According to another aspect of the present disclosure, a method for manufacturing carbon steel for a rack bar includes manufacturing carbon steel containing 0.50 to 0.55% by weight of carbon (C), 0.15 to 0.35% by weight of silicon (Si), 0.75 to 0.95% by weight of manganese (Mn), 0.025% by weight or less of phosphorus (P), 0.025% by weight or less of sulfur (S), 0.65 to 0.85% by weight of chrome (Cr), 0.20% by weight or less of molybdenum (Mo), 0.001 to 0.02% by weight of aluminum (Al), 5 to 50 ppm of boron (B), and iron (Fe) as a remainder and unavoidable impurities. The method also includes quenching, tempering, and drawing the carbon steel, and warm forging the drawn carbon steel.

DETAILED DESCRIPTION

Hereinafter, the present disclosure is described in detail.
Carbon Steel for Rack Bar
The carbon steel for the rack bar according to the present disclosure contains carbon (C), silicon (Si), manganese (Mn), phosphorus (P), sulfur (S), chrome (Cr), molybdenum (Mo), aluminum (Al), boron (B), iron (Fe), and unavoidable impurities.

Carbon (C)

The carbon serves to increase strength and hardness of the carbon steel.

The carbon may be contained in the carbon steel in a content of 0.50 to 0.55% by weight based on a total weight of the carbon steel. When the content of the carbon is less than the above range, tensile strength of the carbon steel may decrease. When the content of the carbon is above the above range, impact toughness may decrease.

Silicon (Si)

The silicon acts as a deoxidizing agent for removing oxygen in the steel and is dissolved in the steel to strengthen strength of a base material.

The silicon may be contained in the carbon steel in a content of 0.15 to 0.35% by weight or 0.17 to 0.32% by weight based on the total weight of the carbon steel. When the content of the silicon is less than the above ranges, the tensile strength of the carbon steel may decrease. When the content of the silicon is above the above ranges, machinability may decrease.

Manganese (Mn)

The manganese serves to improve the strength of the carbon steel, and reacts with the sulfur to form manganese sulfide (MnS) to improve processability.

The manganese may be contained in the carbon steel in a content of 0.75 to 0.95% by weight or 0.78 to 0.88% by weight based on the total weight of the carbon steel. When the content of the manganese is less than the above ranges, the tensile strength of the carbon steel may decrease. When the content of the manganese is above the above ranges, segregation occurs during a heat-treatment, so that decrease in toughness and increase in deformation resistance may occur.

Phosphorus (P)

The phosphorus is an element that acts as the impurity when making the carbon steel, which requires proper adjustment of a content.

The phosphorus may be contained in the carbon steel in a content of 0.025% by weight or less, 0.001 to 0.025% by weight, or 0.01 to 0.02% by weight based on the total weight of the carbon steel. When the content of the phosphorus is above the above ranges, the hardness of the carbon steel may increase and the toughness may decrease, so that a crack may occur and a cost price may increase.

Sulfur (S)

The sulfur reacts with the manganese (Mn) to form the manganese sulfide (MnS) to improve the processability.

The sulfur may be contained in the carbon steel in a content of 0.025% by weight or less, 0.001 to 0.025% by weight, or 0.004 to 0.010% by weight based on the total weight of the carbon steel. When the content of the sulfur is less than the above ranges, the processability of the carbon steel may decrease.

Chrome (Cr)

The chrome serves to improve the strength, hardenability, and the toughness of the carbon steel. Further, the chrome plays an important role in improving permanent deformation resistance of a final product.

The chrome may be contained in the carbon steel in a content of 0.65 to 0.85% by weight or 0.70 to 0.80% by weight based on the total weight of the carbon steel. When the content of the chrome is less than the above ranges, a problem of insufficient durability of the carbon steel may occur. When the content of the chrome is above the above ranges, chromium carbide may be precipitated into grain boundaries to decrease the toughness of the carbon steel.

Molybdenum (Mo)

The molybdenum serves to improve the strength, the hardenability, and the toughness of the carbon steel.

The molybdenum may be contained in the carbon steel in a content of 0.20% by weight or less, 0.001 to 0.20% by weight, or 0.005 to 0.05% by weight based on the total weight of the carbon steel. When the content of the molybdenum is less than the above ranges, the problem of the insufficient durability of the carbon steel may occur. When the content of the molybdenum is above the above ranges, the strength of the carbon steel may increase excessively, so that the decrease in the processability and the increase in the cost may occur.

Aluminum (Al)

The aluminum serves to improve the strength and the toughness by refining crystal grains in the steel.

The aluminum may be contained in the carbon steel in a content of 0.001 to 0.02% by weight or 0.003 to 0.015% by weight based on the total weight of the carbon steel. When the content of the aluminum is less than the above ranges, the grains in the steel may not be refined. When the content of the aluminum is above the above ranges, an inclusion of $Al_2O_3$ may be formed to decrease the toughness of the carbon steel.

Boron (B)

The boron strengthens the grain boundaries of the carbon steel and improves the hardenability.

The boron may be contained in the carbon steel in a content of 5 to 50 ppm or 10 to 30 ppm based on the total weight of the carbon steel. When the content of the boron is less than the above ranges, an effect obtained from addition of the boron may be insufficient. When the content of the boron is above the above ranges, increase in the effect obtained compared to the amount of the boron added may be insufficient, so that decrease in economic feasibility may occur.

Copper (Cu)

The high strength carbon steel may additionally contain the copper (Cu). In this connection, the copper is an element that acts as the impurity when making the carbon steel, which requires proper adjustment of a content.

The copper may be contained in the carbon steel in a content of 0.10% by weight or less or 0.01 to 0.10% by weight based on the total weight of the carbon steel. When the content of the copper is above the above ranges, the hardness of the carbon steel may increase and the toughness thereof may decrease, so that the occurrence of the crack and the increase in the cost may occur.

Nickel (Ni)

The high strength carbon steel may further contain the nickel (Ni). In this connection, the nickel plays a role in improving the strength, the hardenability, and the toughness of the carbon steel.

The nickel may be contained in the carbon steel in a content of 0.30% by weight or less or 0.01 to 0.10% by weight based on the total weight of the carbon steel. When the content of the nickel is above the above ranges, the strength of the carbon steel may excessively increase and the toughness thereof may decrease, so that the occurrence of the crack and the increase in the cost may occur.

Vanadium (V)

The high strength carbon steel may further contain the vanadium (V). In this connection, the vanadium plays a role in improving the strength, the hardenability, and the toughness of the carbon steel.

The vanadium may be contained in the carbon steel in a content of 0.06% by weight or less, 0.001 to 0.03% by weight, or 0.001 to 0.01% by weight based on the total weight of the carbon steel. When the content of the vanadium is less than the above ranges, the problem of the insufficient durability of the carbon steel may occur. When the content of the vanadium is above the above ranges, the strength of the carbon steel may increase excessively, so that the decrease in the processability and the increase in the cost may occur.

Iron (Fe) and impurities

The carbon steel contains the iron and other unavoidable impurities.

The carbon steel may contain the unavoidable impurities in a very small amount. The unavoidable impurities may be contained in the very small amount so as not to affect properties such as the strength, the processability, and the durability of the carbon steel.

The carbon steel may have the tensile strength equal to or above 800 MPa, an elongation percentage equal to or above 20%, equal to or above 23%, or between 23 and 30%, room temperature impact strength equal to or above 100 J/cm$^2$, equal to or above 150 J/cm$^2$, equal to or above 200 J/cm$^2$, or between 200 and 300 J/cm$^2$.

Further, the carbon steel may have the yield strength equal to or above 600 MPa or equal to or above 650 MPa.

The carbon steel for the rack bar according to the present disclosure as described above has the excellent mechanical properties such as the yield strength, the tensile strength, and the toughness, thereby having excellent durability even in a high load environment and capable of reducing a weight of a vehicle. Accordingly, the carbon steel for the rack bar is very suitable to be applied as a material for vehicle components, especially for steering components such as the rack bar.

Rack Bar for Vehicle and Vehicle

The rack bar for the vehicle according to the present disclosure contains the carbon steel for the rack bar as described above or herein. Further, the vehicle according to the present disclosure includes the rack bar for the vehicle as described above or herein.

Method for Manufacturing Carbon Steel for Rack Bar

Further, the method for manufacturing the carbon steel for the rack bar of the present disclosure includes: manufacturing carbon steel; quenching, tempering, and drawing the carbon steel; and warm forging the drawn carbon steel.

Manufacturing Carbon Steel

In the present operation, the carbon steel containing the carbon (C), the silicon (Si), the manganese (Mn), the phosphorus (P), the sulfur (S), the chrome (Cr), the molybdenum (Mo), the aluminum (Al), the boron (B), the iron (Fe), and the unavoidable impurities is manufactured. In this connection, the carbon steel may be in a form of a wire rod, but may not be limited thereto.

The carbon steel contains 0.50 to 0.55% by weight of the carbon (C), 0.15 to 0.35% by weight of the silicon (Si), 0.75 to 0.95% by weight of the manganese (Mn), 0.025% by weight or less of the phosphorus (P), 0.025% by weight or less of the sulfur (S), 0.65 to 0.85% by weight of the chrome (Cr), 0.20% by weight or less of the molybdenum (Mo), 0.001 to 0.02% by weight of the aluminum (Al), 5 to 50 ppm of the boron (B), and the iron (Fe) as the remainder and the unavoidable impurities. For example, the carbon steel may contain 0.50 to 0.55% by weight of the carbon (C), 0.17 to 0.32% by weight of the silicon (Si), 0.78 to 0.88% by weight of the manganese (Mn), 0.025% by weight or less of the phosphorus (P), 0.025% by weight or less of the sulfur (S), 0.10% by weight or less of the copper (Cu), 0.30% by weight or less of the nickel (Ni), 0.70 to 0.80% by weight of the chrome(Cr), 0.20% by weight or less of the molybdenum (Mo), 0.003 to 0.015% by weight of the aluminum (Al), 10 to 30 ppm of the boron (B), and the iron (Fe) as the remainder and the unavoidable impurities.

Further, the carbon steel may contain an additional component as described in the carbon steel for the rack bar.

The present operation is not particularly limited in general as long as being a method for preparing a material for the rack bar. For example, the present operation may include a reheating process, a hot rolling process, a winding process, and a cooling process.

Specifically, the reheating process may be performed for 0.5 to 5 hours or 1 to 3 hours at a slab reheating temperature (SRT) of between 900 and 1,300° C. or between 950 and 1,100° C. When the slab reheating temperature is less than the above ranges, components precipitated during casting may not be sufficiently re-dissolved and a rolling load may become large. On the other hand, when the slab reheating temperature is above the above ranges, decarburization may occur excessively, an austenite grain size may increase, which may make it difficult to secure the strength, and the cost of manufacturing the carbon steel may increase by an excessive heating process.

Further, the hot rolling process may be performed at between 750 and 900° C. or between 780 and 850° C. When the rolling temperature is above the above ranges, the decarburization may occur, pearlite nucleation resulted from coarse grains may be delayed, and temperature controllability may decrease as a deviation from a coiling temperature increases. On the other hand, when the rolling temperature is too low below the above ranges, a large rolling load may be applied.

For example, the winding process may be performed by passing a laying head at a temperature between 700 and 850° C. or between 750 and 830° C. When the winding temperature is controlled to be within the above ranges, it is advantageous to adjust a level of phase transformation from the austenite to the pearlite structure.

Further, the cooling process may be performed while controlling the billet at an average cooling rate equal to or below 5° C./s or between 0.3 and 5° C./s after being wound by passing the laying head. A grain size of a microstructure and a microstructure fraction of the carbon steel may be adjusted by adjusting the cooling rate of the cooling process.

Quenching, Tempering, and Drawing Carbon Steel

In the present operation, the carbon steel is quenched, tempered, and drawn. Through the present operation, the carbon steel in the form of the wire rod may be manufactured in a straight line form.

For example, the quenching may be performed at a temperature between 900 and 1,000° C. or between 930 and 970° C. As the quenching temperature is adjusted to be within the above ranges, strength and toughness of the final product are further improved. The quenching may be controlled such that the physical properties of the carbon steel, for example, the tensile strength of equal to or above 880 MPa, equal to or above 900 MPa, or between 880 and 1200 MPa, the elongation percentage of between 15 and 20% or between 17.0 and 19.5%, and the room temperature impact strength between 100 and 150 J/cm$^2$ or between 110 and 140 J/cm$^2$ may be satisfied.

Further, the tempering may be performed at a temperature between 710 and 740° C. or between 715 and 735° C. As the tempering temperature is adjusted to be within the above ranges, the strength and the toughness of the final product are further improved. The tempering may be controlled such that the physical properties of the carbon steel, for example, the tensile strength of equal to or above 900 MPa or between 900 and 1000 MPa, the elongation percentage of between 16 and 21% or between 17.0 and 20%, and the room temperature impact strength between 100 and 150 J/cm² or between 110 and 135 J/cm² may be satisfied.

The drawing may be controlled such that a drawing reduction percentage is between 10 and 20% or between 13 and 15%. In this case, when manufacturing the final rack bar product, not only a direction of bending may be controlled outward, but also an amount of bending may be further reduced.

In this connection, in the present operation, the quenching, the tempering, and the drawing may be performed while transferring the carbon steel at a speed between 50 and 80 mm/sec or between 55 and 75 mm/sec. When the transfer speed is less than the above ranges, the carbon steel is overheated, so that the decarburization may occur. When the transfer speed is above the above ranges, there may be a problem in that the heat-treatment is not uniformly conducted to a core of the carbon steel.

Warm Forging Drawn Carbon Steel

In the present operation, the drawn carbon steel is warm forged. Through the present operation, gear teeth of the carbon steel in the straight line form may be molded using a forging mold.

The warm forging may be performed between 580 and 730° C. or between 600 and 700° C. for 15 to 120 minutes or 20 to 60 minutes.

As the temperature is adjusted to be within the ranges during the warm forging, the strength and the toughness of the final product are further improved. The warm forging may be controlled such that the physical properties of the carbon steel, for example, the tensile strength of equal to or above 800 MPa or between 800 and 950 MPa, the elongation percentage of between 20 and 30% or between 23 and 29%, and the room temperature impact strength between 180 and 300 J/cm² or between 200 and 280 J/cm² may be satisfied.

The manufacturing method of the present disclosure may further include performing high-frequency hardening heat-treating on the warm forged carbon steel. In this connection, through the high-frequency hardening heat-treating, surface hardness may be improved to prevent wear of the gear teeth of the rack bar.

In this connection, a frequency of the high-frequency, a processing time, and the like used for the high-frequency hardening heat-treating may be appropriately selected based on a size of the rack bar, a thickness of the gear teeth, and the like.

Further, the manufacturing method of the present disclosure may further include straightening the heat-treated carbon steel. In this connection, through the straightening, overall straightness of the rack bar may be corrected.

A method for straightening may not be particularly limited. Further, a method generally used in a field of the vehicle steering components may be used. Through such straightening, the bending occurred outward may be corrected, thereby reducing an incidence of defects and further improving productivity.

The method for manufacturing the carbon steel for the rack bar according to the present disclosure as described above may manufacture carbon steel for the rack bar that minimizes the decrease in the tensile strength and significantly improves the elongation percentage and the room temperature impact strength.

Hereinafter, the present disclosure is described in more detail through Present Examples. However, Present Examples are only intended to help understand the present disclosure, and the scope of the present disclosure is not limited to such Present Examples in any sense.

PRESENT EXAMPLES

Present Example 1 and Comparative Examples 1 to 6. Manufacture of Carbon Steel for Rack Bar 1) Manufacture of Carbon Steel Blooms containing components in compositions as shown in Table 1 below were manufactured and then rolled into billets at 1,250° C. Thereafter, the billets were reheated at 1,000±100° C., then hot rolled at about 1,000° C., then wound at a temperature between 850 and 900° C., and then cooled at about 500° C. while being transferred at the average cooling rate of 3 to 12° C./sec to be manufactured as the carbon steels.

TABLE 1

| Component (% by weight) Fe and unavoidable impurities | Present example 1 Remaining amount | Comparative example 1 Remaining amount | Comparative example 2 Remaining amount | Comparative example 3 Remaining amount | Comparative example 5 Remaining amount | Comparative example 5 Remaining amount | Comparative example 6 Remaining amount |
|---|---|---|---|---|---|---|---|
| C | 0.53 | 0.53 | 0.53 | 0.59 | 0.45 | 0.52 | 0.44 |
| Si | 0.22 | 0.21 | 0.2 | 0.22 | 0.25 | 0.21 | 0.19 |
| Mn | 0.83 | 0.83 | 0.84 | 0.83 | 0.78 | 0.72 | 0.73 |
| P | 0.015 | 0.016 | 0.015 | 0.01 | 0.018 | 0.015 | 0.014 |
| S | 0.007 | 0.009 | 0.009 | 0.001 | 0.002 | 0.008 | 0.002 |
| Cr | 0.74 | 0.25 | 0.4 | 0.71 | 0.15 | 0.25 | 0.12 |
| Mo | 0.01 | 0.20 | 0.19 | 0.01 | 0.01 | 0.01 | — |
| Al | 0.008 | 0.019 | 0.021 | 0.025 | 0.008 | 0.004 | 0.03 |
| V | — | 0.057 | 0.056 | — | — | — | — |
| B (ppm) | 21 | 5 | 4 | 20 | 2 | 20 | 2 |

(2) Quenching

The carbon steels manufactured in 1) were oil-quenched at 950° C. while being transferred at 65 mm/sec and then were tempered while being transferred at 65 mm/sec at 725° C. Then, the yield strength, the tensile strength, the elongation percentage, and the room temperature impact strength of each carbon steel were measured. Specifically, the yield strength and the tensile strength were measured in a test method based on ISO 6892, and the room temperature impact strength was measured in a test method based on ISO 148-1 in a Charpy impact test. The results of the measurement are shown in Table 2 below.

TABLE 2

| Example | Structure | Yield strength (mpa) | Tensile strength (mpa) | Elongation percentage (%) | Room temperature impact strength (J/cm$^2$) |
|---|---|---|---|---|---|
| Goal | — | — | Equal to or above 900 mpa | Equal to or above 15% | Equal to or above 100 j/cm$^2$ |
| Present Example 1 | Tempered Martensite | 794 | 933 | 18.1 | 124 |
| Comparative example 1 | Tempered martensite | 980 | 1085 | 14.3 | 106 |
| Comparative example 2 | Tempered martensite | 990 | 1083 | 16.4 | 124 |
| Comparative example 3 | Tempered martensite | 871 | 989 | 16.6 | 92 |

TABLE 2-continued

| Example | Structure | Yield strength (mpa) | Tensile strength (mpa) | Elongation percentage (%) | Room temperature impact strength (J/cm$^2$) |
|---|---|---|---|---|---|
| Comparative example 4 | Tempered martensite | 712 | 866 | 10 | 99 |
| Comparative example 5 | Tempered martensite | 604 | 822 | 21.2 | 148 |
| Comparative example 6 | Ferrite + pearlite | 596 | 767 | 20 | 47 |

As shown in Table 2, Comparative Example 1 containing a small amount of chrome and an excessive amount of molybdenum has insufficient percentage, and has a poor economic feasibility because of containing the excessive amount of molybdenum. Further, in Comparative Example 2 containing a small amount of chrome and excessive amounts of molybdenum and aluminum, the crack occurred on a surface during the quenching because of excessive hardenability. Further, Comparative Example 3 containing an excessive amount of carbon has insufficient room temperature impact strength, and Comparative Example 4 containing small amounts of carbon and chrome has insufficient elongation percentage and room temperature impact strength. Further, Comparative Example 5 containing small amounts of manganese and chrome has insufficient strength. Furthermore, Comparative Example 6 containing small amounts of carbon, manganese, and chrome, and an excessive amount of aluminum and not containing the molybdenum has insufficient tensile strength and room temperature impact strength.

3) Tempering

The quenched carbon steels of Present Example 1 manufactured in 2) were tempered at 650 to 750° C. while being transferred at 65 mm/sec. Then, the yield strength, the tensile strength, the elongation percentage, and the room temperature impact strength of each carbon steel were measured. In this connection, a method for measuring the physical properties was the same as the method in item 2). The results of the measurement are shown in Table 3.

TABLE 3

| Example | Tempering temperature | Structure | Yield strength (mpa) | Tensile strength (mpa) | Elongation percentage (%) | Room temperature impact strength (J/cm$^2$) |
|---|---|---|---|---|---|---|
| Goal | — | — | — | Equal to or above 900 mpa | — | Equal to or above 100 J/cm$^2$ |
| Present example 1-1 | 750° C. | Tempered martensite | 705 | 870 | 22.3 | 142 |
| Present example 1-2 | 725° C. | Tempered martensite | 794 | 933 | 18.1 | 124 |
| Present example 1-3 | 700° C. | Tempered martensite | 807 | 950 | 15.2 | 95 |
| Present example 1-4 | 675° C. | Tempered martensite | 834 | 962 | 12.2 | 88 |
| Present example 1-5 | 650° C. | Tempered martensite | 852 | 978 | 10.8 | 75 |

As shown in Table 3, in Present Example 1-1 with the tempering temperature equal to or above 750° C., the tensile strength of the carbon steel is insufficient to be equal to or less than 900 MPa and the yield strength is also insufficient. In Present Examples 1-3 to 1-5 at the temperature equal to or below 700° C., the room temperature impact strengths of the carbon steels are insufficient to be equal to or less than 100 J/cm$^2$. On the other hand, Present Example 1-2 tempered at 725° C. has adequate tensile strength and room temperature impact strength, and also has adequate yield strength and elongation percentage.

4) Drawing and Warm Forging

The tempered carbon steels of Example 1-2 manufactured in 3) were drawn such that the drawing reduction percentages thereof become equal to or above 10%, and then, were warm forged at a temperature between 600 and 750° C. for 30 minutes. Then, the yield strength, the tensile strength, the elongation percentage, and the room temperature impact strength of each carbon steel were measured. In this connection, a method for measuring the physical properties was the same as the method in item 2). The results of the measurement are shown in Table 4.

TABLE 4

| Example | Temperature of warm forging | Yield strength (mpa) | Tensile strength (mpa) | Elongation percentage (%) | Room temperature impact strength (J/cm²) |
|---|---|---|---|---|---|
| Goal | — | Equal to or above 600 mpa | Equal to or above 800 mpa | Equal to or above 15% | Equal to or above 150 J/cm² |
| Present example 1-2 | X | 871 | 988 | 16.6 | 130 |
| Present example 1-2-1 | 600° c. | 728 | 851 | 24.2 | 205 |
| Present example 1-2-2 | 650° c. | 730 | 851 | 25.5 | 229 |
| Present example 1-2-3 | 700° c. | 666 | 805 | 28.8 | 266 |
| Present example 1-2-4 | 750° c. | 582 | 706 | 31.4 | 305 |

As shown in Table 4, Present Example 1-2-4 with the temperature of the warm forging of 750° C. has insufficient yield strength and tensile strength.

Further, when the warm forging is performed at less than 600° C., it is difficult to obtain a desired forged shape because the temperature is low and thus moldability is low. Further, wear of the mold and damage resulted from impact may occur.

Further, the carbon steels of Comparative Example 6 manufactured in 2) were tempered at 725° C. while being transferred at 65 mm/sec, then drawn such that the drawing reduction percentages thereof become 13%, and then warm forged at a temperature between 600 and 700° C. for 30 minutes. Then, the yield strength, the tensile strength, the elongation percentage, and the room temperature impact strength thereof were measured. In this connection, a method for measuring the physical properties was the same as the method in item 2). The results of the measurement are shown in Table 5.

TABLE 5

| | Comparative example 6 | | | | Example 1-2 | | | |
|---|---|---|---|---|---|---|---|---|
| Warm forging temperature | Yield strength (mpa) | Tensile strength (mpa) | Elongation percentage (%) | Room temperature impact strength (J/cm²) | Yield strength (mpa) | Tensile strength (mpa) | Elongation percentage (%) | Room temperature impact strength (J/cm²) |
| X | 614 | 767 | 11.9 | 50 | 871 | 988 | 16.6 | 130 |
| 600° C. | 550 | 718 | 17.9 | 55 | 728 | 851 | 24.2 | 205 |
| 650° C. | 490 | 655 | 21.1 | 66 | 730 | 851 | 25.5 | 229 |
| 700° C. | 430 | 590 | 25 | 97 | 666 | 805 | 28.8 | 266 |

As shown in Table 5, compared to Comparative Example 6, in Present Example 1-2, the yield strength is improved by 30% or more, the tensile strength is improved by 24% or more, and the room temperature impact strength is improved by 170% or more.

Test Example: Evaluation of Properties

For the carbon steels for the rack bar of Present Example 1-2-2 and Comparative Example 6 warm forged at 650° C., which were manufactured in Present Examples and Comparative Examples, minimum crack loads and maximum loads were measured using a following method. The results of the measurement are shown in Table 6.

A bending test was performed by pressing a portion with a gear vertically while fixing one side of the rack bar to measure a load at which initial crack occurs in the gear portion as an initial crack load and a maximum load of when complete breakage occurs.

TABLE 6

| | Comparative Example 6 | | Present Example 1-2-2 | |
|---|---|---|---|---|
| Property | Initial crack load | Maximum load | Initial crack load | Maximum load |
| Bending strength (N) | 8,595 | 8,595 | 9,350 | 10,412 |

As shown in Table 6, compared to Comparative Example 6, in the carbon steel of Present Example 1-2-2, the initial crack load is improved by 8.78% and the maximum load is improved by 21.14%. Further, in Present Example 1-2-2, the rack bar does not break even when the initial crack occurs, which shows improved breaking strength. Thus, it may be seen that Present Example 1-2-2 has excellent stability against a vehicle collision and a damage when being applied to the vehicle.

The rack bar according to the present disclosure has the excellent mechanical properties such as the yield strength, the tensile strength, the toughness, and the like, thereby having the excellent durability even in the high load environment and capable of reducing the vehicle weight. Accordingly, the carbon steel for the rack bar is very suitable to be applied as a material for vehicle components.

Hereinabove, although the present disclosure has been described with reference to embodiments, the present disclosure is not limited thereto. The disclosed embodiments may be variously modified and altered by those having ordinary skill in the art to which the present disclosure pertains without departing from the spirit and scope of the present disclosure claimed in the following claims.

What is claimed is:

1. A carbon steel for a rack bar, the carbon steel consisting of:
   0.50 to 0.55% by weight of carbon (C);
   0.17 to 0.32% by weight of silicon (Si);
   0.78 to 0.88% by weight of manganese (Mn);
   0.025% by weight or less of phosphorus (P);
   0.025% by weight or less of sulfur (S);

0.70 to 0.80% by weight of chromium (Cr);
0.001 to 0.05% by weight of molybdenum (Mo);
0.003 to 0.015% by weight of aluminum (Al);
10 to 30 ppm of boron (B);
0 to 0.10% by weight of copper (Cu);
0 to 0.30% by weight of nickel (Ni); and
iron (Fe) as a remainder and unavoidable impurities.

2. The carbon steel of claim 1, wherein the carbon steel has:
0.01 to 0.10% by weight of the copper (Cu); and
0.01 to 0.30% by weight of the nickel (Ni).

3. The carbon steel of claim 1, wherein the carbon steel comprises a tensile strength equal to or above 800 MPa, an elongation percentage equal to or above 20%, and a room temperature impact strength equal to or above 100 $J/cm^2$.

4. A rack bar for a vehicle containing the carbon steel of claim 1.

5. A vehicle including the rack bar for the vehicle of claim 4.

6. The carbon steel of claim 3, wherein the elongation percentage is equal to or above 23%, and
wherein the room temperature impact strength is equal to or above 150 $J/cm^2$.

7. The carbon steel of claim 3, wherein the elongation percentage is equal to or above 23%, and
wherein the room temperature impact strength is equal to or above 200 $J/cm^2$.

8. The carbon steel of claim 3, wherein the elongation percentage is equal to or above 23%, and
wherein the room temperature impact strength is in a range of 200 to 300 $J/cm^2$.

9. The carbon steel of claim 3, wherein the elongation percentage is in a range of 23% to 30%, and
wherein the room temperature impact strength is equal to or above 150 $J/cm^2$.

10. The carbon steel of claim 3, wherein the elongation percentage is in a range of 23% to 30%, and
wherein the room temperature impact strength is equal to or above 200 $J/cm^2$.

11. The carbon steel of claim 3, wherein the elongation percentage is in a range of 23% to 30%, and
wherein the room temperature impact strength is in a range of 200 to 300 $J/cm^2$.

* * * * *